SCALE COMPRESSING CIRCUIT

Filed Dec. 20, 1952 2 Sheets-Sheet 1

Inventor:
Wesley S. Burt,
by Richard E. Hosley
His Attorney.

Inventor:
Wesley S. Burt,
by Richard E. Hosley
His Attorney.

United States Patent Office 2,824,286 Patented Feb. 18, 1958

1

2,824,286

SCALE COMPRESSING CIRCUIT

Wesley S. Burt, Lynnfield Center, Mass., assignor to General Electric Company, a corporation of New York Application December 20, 1952, Serial No. 327,115

6 Claims. (Cl. 324—132)

My invention relates to electrical measuring apparatus, and in particular to a scale compressing circuit whereby a selected portion of an instrument scale is compressed, thus permitting a larger scale in regions where highest accuracy is desired.

For example, my invention may be used in a vibration amplitude recorder which is part of the supervisory equipment for large rotating machinery. A suitable vibration velocity detector, mounted on the large machine, provides an alternating electric signal having an amplitude proportional to the vibration amplitude. The value of this signal is displayed by a suitable indicating or recording electrical instrument. It may be desired, for example, that vibration amplitudes of 0 to 2 mils be displayed on a large scale, for maximum accuracy, while vibration amplitudes from 2 to 10 mils be displayed on a smaller scale. This is accomplished by my scale compressing circuit, while using a standard recording instrument having a linear scale distribution.

A principal object of my invention is to achieve the desired scale distribution by means which are economical, yet reliable and accurate. Briefly stated, this is accomplished by providing amplifying means for the electric signal, and means for reducing the gain of such amplifying means whenever the signal amplitude exceeds a predetermined value, corresponding to a vibration amplitude of 2 mils, for example.

Figure 3:
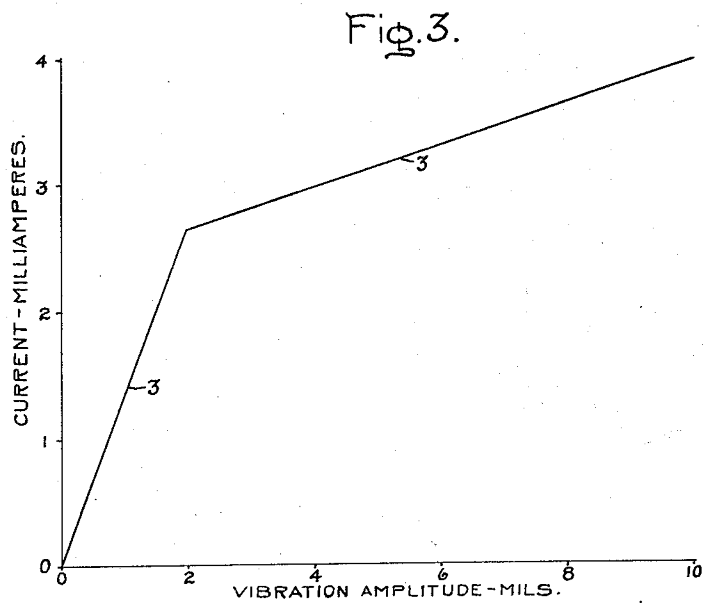
Figure 4:
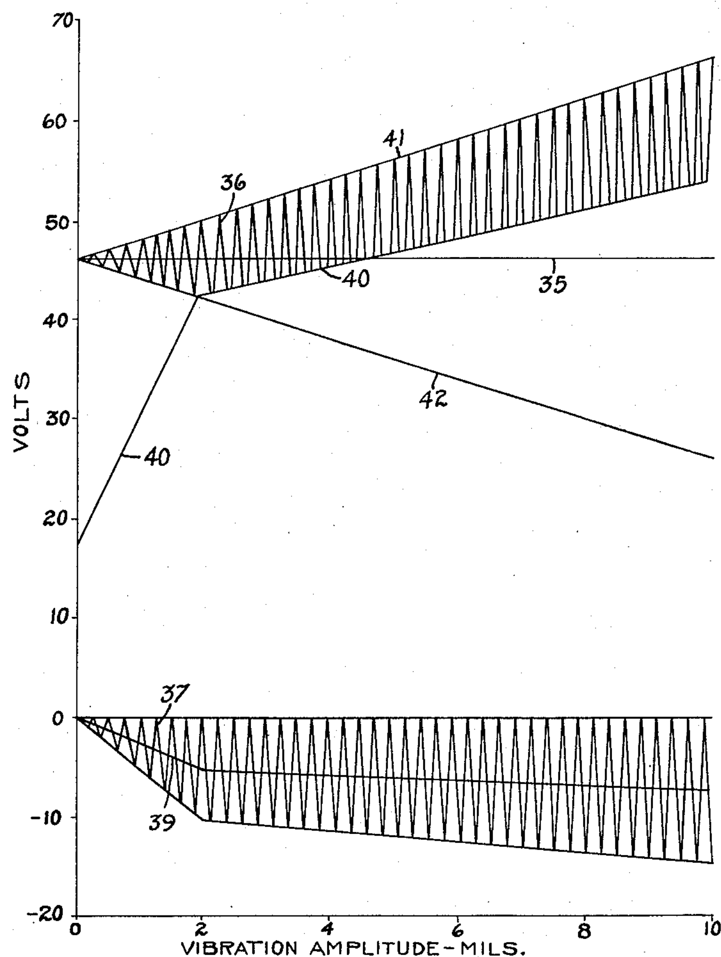

My invention will be better understood from the following description taken in connection with the accompanying drawings, and its scope will be pointed out in the appended claims. In the drawings, Fig. 1 is a schematic diagram of a vibration recorder embodying principles of my invention, Fig. 2 represents the recorder scale, illustrating the desired scale distribution, Fig. 3 is a diagram representing the relation between current supplied to the recording instrument and vibration amplitude, and Fig. 4 is a diagram illustrating voltage relations within the circuit.

Figure 1:
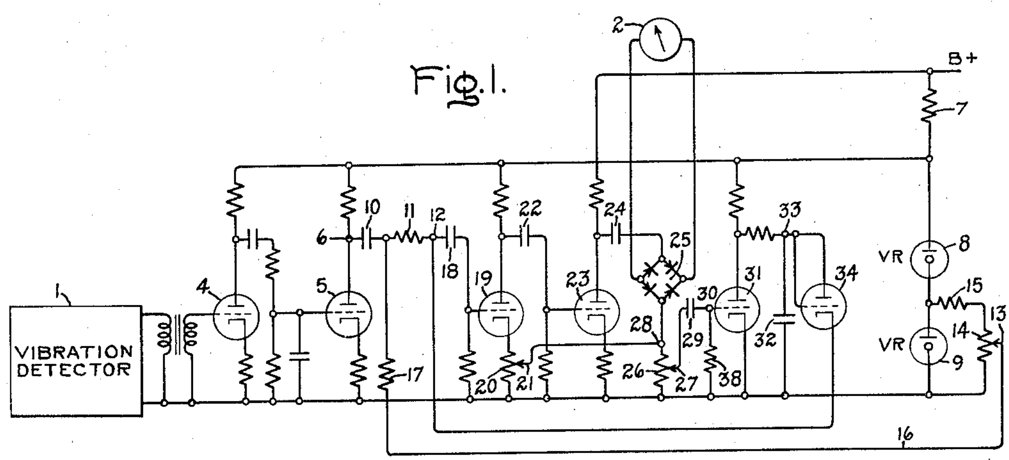

Referring now to Fig. 1, a vibration detector 1, which may be of a conventional type, provides an alternating electric signal having an amplitude proportional to the vibration amplitude. A suitable indicating or recording electric instrument 2 displays values of vibration amplitude on a suitably calibrated scale. For example, instrument 2 may be a conventional electric recorder, having an inherently linear scale distribution, responsive to direct currents of 0 to 4 milliamperes.

Figure 2:
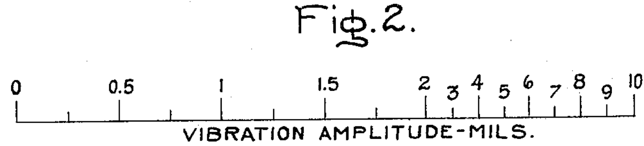

Fig. 2 represents the desired scale distribution in terms of vibration amplitude. It will be noted that the scale distribution is linear between 0 and 2 mils, and that this portion occupies roughly two-thirds of the instrument scale, so that the values of vibration amplitude within this range are displayed with high accuracy. The scale distribution from 2 to 10 mils is also linear, but this portion has been compressed into approximately one-third of the instrument scale.

2

Since the recorder has a substantially linear response to direct currents of 0 to 4 milliamperes, the desired scale distribution requires that current supplied to the recording instrument be related to vibration amplitude in the manner illustrated by curve 3, Fig. 3. It will be noted that, between 0 and 2 mils, curve 3 is a straight line having a relatively steep slope, so that, at a vibration amplitude of 2 mils a current of two and two-thirds milliamperes is supplied to the recording instrument. At vibration amplitudes greater than 2 mils, curve 3 is a straight line of relatively small slope, so that the full-scale current of 4 milliamperes is reached at a vibration amplitude of 10 mils. The means for obtaining this relation will now be described.

Again referring to Fig. 1, the alternating electric signal from vibration detector 1 is amplified by two conventional vacuum tube amplifier stages 4 and 5. Thus, there is provided at circuit junction 6 an alternating electric signal having an amplitude proportional to the vibration amplitude. Anode voltage for the vacuum tubes is obtained from any suitable supply, conventionally designated B+, through a voltage dropping resistor 7. The anode voltage may be regulated by voltage regulator tubes 8 and 9, connected in series as shown. The supply voltage may be 420 volts, for example, and the voltage drop across each voltage regulator tube may be 150 volts, for example, so that the vacuum tube anode supply voltages are stabilized at a value of 300 volts.

The alternating voltage signal at circuit junction 6 is transmitted through capacitor 10 and resistor 11 to circuit junction 12. A direct voltage of adjustable value is obtained from an adjustable tap 13 of a resistor 14 connected in series with another resistor 15 across voltage regulator tube 9, as shown. This direct voltage is supplied through connection 16, resistor 17 and resistor 11 to circuit junction 12.

The alternating voltage at circuit junction 12 is transmitted through a capacitor 18 to the control grid of a vacuum tube 19. The cathode of tube 19 is connected to a cathode resistor 20 having an adjustable tap 21. The anode of tube 19 is connected through a capacitor 22 to the control grid of a vacuum tube 23. The anode of tube 23 is connected through a capacitor 24 to a rectifier bridge 25 in series with a resistor 26 having an adjustable tap 27. The circuit junction 28 between rectifier bridge 25 and resistor 26 is connected to tap 21. The output terminals of rectifier bridge 25 are connected to the instrument 2.

The alternating voltage at circuit junction 12 is amplified by tubes 19 and 23, and rectified by rectifier bridge 25, to provide a direct current to instrument 2 which is proportional in value to the amplitude of the alternating voltage at junction 12. The connection between junction 28 and tap 21 provides negative feedback, of an amount depending upon the adjustment of tap 21, so that the gain of the amplifier can be adjusted by changing the position of tap 21. This adjustment is made so that a vibration amplitude of 2 mils provides to instrument 2 a current of two and two-thirds milliamperes, as is required to obtain the desired scale distribution between 0 and 2 mils.

Tap 27 is connected through a capacitor 29 to the input terminal 30 of a conventional grid-biased detector comprising a vacuum tube 31 and a capacitor 32. The output terminal 33 of this detector is connected to the anode of a diode rectifier 34. If desired, the diode rectifier 34 may consist of a triode vacuum tube with its control grid connected to its anode, as shown. The cathode of rectifier 34 is connected to circuit junction 12.

Operation of the circuit may best be understood by referring to Fig. 4. The horizontal line 35 represents the direct voltage supplied to circuit junction 12 by adjustable tap 13. This voltage may be adjusted to a value of 46 volts, for example. Curve 36 represents the alternating voltage at junction 12.

Assume, for example, vibrations which steadily increase in amplitude from 0 to 10 mils. Consider first the region from 0 to 2 mils of vibration amplitude. In this region, the amplitude of the alternating voltage at junction 12, represented by curve 36, is proportional to the vibration amplitude. This alternating voltage is amplified by vacuum tubes 19 and 23, rectified by bridge rectifier 25, and a proportional direct current is supplied to instrument 2 which operates the instrument through two-thirds of its full-scale range as the vibration amplitude increases from 0 to 2 mils.

An alternating voltage is also provided at tap 27, which is transmitted through capacitor 29 to circuit junction 30. Voltage at junction 30 is represented by curve 37. Grid current from the detector vacuum tube 31 flowing through grid-bias resistor 38 prevents the voltage at junction 30 from substantially exceeding 0, and consequently a negative D. C. bias, represented by line 39, is applied to the control grid of vacuum tube 31. This produces a voltage at circuit junction 33 which increases as the vibration amplitude increases, and the value of which is represented by curve 40.

If the circuit between rectifier 34 and junction 12 were opened, the alternating voltage at junction 12 would continue to increase with increasing vibration amplitude at the large rate represented by the angle between lines 41 and 42. However, with this circuit closed, as illustrated, the amplitude of the alternating voltage is limited in the following manner: At vibration amplitudes smaller than 2 mils, because of the voltage supplied from the tap 13 of resistor 14, instantaneous values of the voltage at junction 12 are always greater than the voltage at junction 33, and no current is conducted by rectifier 34. At vibration amplitudes greater than 2 mils, there are instantaneous values of voltage at junction 12 which tend to fall below the voltage at junction 33, represented by curve 40. When this occurs, rectifier 34 conducts current, which prevents the instantaneous voltage at junction 12 from falling substantially below the voltage at junction 33. Of course, as the vibration amplitudes increase above 2 mils, the unidirectional voltage present at junction 33 increases as shown by curve 40. The result of this is to limit the amplitude of voltage alternations at junction 12 so that the amplitude of this voltage increases at a much slower rate after the vibration amplitude exceeds the 2 mil value. Since the direct current supplied to instrument 2 is proportional to the amplitude of the alternating voltage at junction 12, a characteristic is obtained which has the desired form illustrated by curve 3, Fig. 3. That is, the current supplied to instrument 2 increases rapidly and linearly, with increasing vibration amplitude up to an amplitude of 2 mils, and thereafter increases more slowly, but again linearly, as the vibration amplitude increases from 2 mils to 10 mils. In other words, the amplifier gain is automatically reduced whenever the vibration amplitude exceeds 2 mils. The steepness of the slope in the left-hand portion of curve 3 can be adjusted by changing the position of tap 21, and the slope of the right-hand portion of curve 3 can be adjusted by changing the position of tap 27. The transition point, that is, the vibration amplitude at which curve 3 changes from one slope to the other, can be adjusted by changing the position of tap 13 to adjust the value of the direct voltage supplied to circuit junction 12. By making these three adjustments, it is possible to obtain the desired scale distribution.

It will be understood that my invention is not limited to the specific embodiment herein illustrated and described, and that the following claims are intended to cover all changes and modifications which do not depart from the true spirit and scope of the invention.

What I claim as new and desire to secure by Letters Patent of the United States is:

1. Electrical measuring apparatus comprising means providing an alternating electric signal having amplitudes proportional to the measured quantities, a resistor having first and second terminals, a first capacitor connected to transmit said signal to said first terminal, means supplying a first unidirectional voltage to said first terminal, means for adjusting the value of said first unidirectional voltage, a second capacitor connected to said second terminal, an amplifier connected with said second terminal through said second capacitor to amplify the alternating voltage of said second terminal, means to adjust the gain of said amplifier, a detector connected to provide a second unidirectional voltage adjustably proportional to the amplitude of the amplified alternating voltage output from said amplifier, a rectifier connected between said second terminal and said detector to prevent the instantaneous voltage of said second terminal from falling substantially below the value of said second unidirectional voltage, whereby effectively the gain of said amplifier is reduced when instantaneous values of said alternating signal plus said first unidirectional voltage become less than said second unidirectional voltage, and electric instrument means responsive to the amplitude of said amplified voltage output from said amplifier.

2. Electrical measuring apparatus comprising a measuring instrument producing alternating electric signals having amplitudes linearly proportional to measured quantities, an alternating voltage amplifier, means for rectifying the alternating voltage output of said amplifier, a direct current instrument coupled to respond to the direct current output of said rectifying means and having a response which is linearly proportional to said direct current output, detector means responsive to said alternating voltage output of said amplifier and producing a unidirectional output voltage proportional to said alternating voltage output of said amplifier, a source of unidirectional voltage, means adding said unidirectional voltage from said source to said alternating electric signals, voltage limiting means limiting instantaneous values of said alternating electric signals plus said unidirectional signals from said source to voltages in excess of said unidirectional output voltage from said detector means, and means applying the alternating voltage component of said excess voltages to said amplifier.

3. Electric measuring apparatus comprising a vibration detector producing alternating electric output signals having amplitudes linearly proportional to vibration amplitudes, an alternating voltage amplifier, a rectifier rectifying the alternating voltage output of said amplifier, a direct current measuring instrument actuated by the output of said rectifier and having a response which is linearly proportional to direct current, detector means responsive to said alternating voltage output of said amplifier and producing a unidirectional output voltage adjustably proportional to said alternating voltage output of said amplifier, a source of adjustable unidirectional voltage, means for controlling the gain of said amplifier in adjustable inverse proportion to said alternating voltage output of said amplifier, means adding said unidirectional voltage from said source to said vibration detector alternating output signals, rectifier means coupled in series with said unidirectional voltage from said detector and with said added unidirectional voltage and output signals to produce instantaneous voltages which are limited to the excess of said added voltage and signals above said unidirectional voltage from said detector, and means applying said excess instantaneous voltages to said amplifier.

4. A scale compressing circuit for an electrical measuring instrument comprising means for providing and adding a first unidirectional voltage of predetermined amplitude to an alternating current signal whose varying amplitudes are to be measured, an alternating voltage amplifier, detector means responsive to an alternating voltage output of said amplifier for providing a second unidirectional voltage proportional to said alternating voltage output, means including a rectifier connected to receive said added voltages and said second unidirectional voltage for limiting instantaneous values of said added voltages to voltages in excess of said second unidirectional voltage, means applying the alternating voltage component of said excess voltages to said amplifier, whereby effectively the gain of said amplifier is reduced when instantaneous values of said alternating signal plus said first unidirectional voltage become less than said second unidirectional voltage, and means for supplying the output of said amplifier to said electrical measuring instrument.

5. A scale compressing circuit for an electrical measuring instrument comprising an alternating current amplifier, a resistor and capacitor connected in series in the input circuit of said amplifier, means for supplying through said resistor to said amplifier an alternating current signal whose varying amplitudes are to be measured, means for providing and supplying through said resistor to said amplifier a first unidirectional voltage of predetermined value, detector means responsive to an alternating voltage output of said amplifier for providing a second unidirectional voltage proportional to said alternating voltage output, rectifier means connected between said detector means and the junction of said resistor and said capacitor to prevent the instantaneous voltage at said junction from falling substantially below the value of said second unidirectional voltage of said detector means, whereby effectively the gain of said amplifier is reduced when instantaneous values of said alternating signal plus said first unidirectional voltage become less than said second unidirectional voltage, and means for supplying the output of said amplifier to said electrical measuring instrument.

6. A scale compressing circuit for an electrical measuring instrument comprising a first resistor, means for transmitting to said first resistor an alternating current signal whose varying amplitudes are to be measured, means for providing and supplying a first unidirectional voltage to said first resistor, first and second vacuum tubes each having an anode, a control grid and a cathode, a first capacitor connected between said first resistor and the grid of said first tube, a second resistor connected in the cathode circuit of said first tube, said second resistor having an adjustable tap, a third resistor connected in the cathode circuit of said second tube, a second capacitor connected between the anode of said first tube and the grid of said second tube, a bridge rectifier having input terminals and output terminals, a circuit including a third capacitor, the input terminals of said bridge rectifier, and a fourth resistor connected in series from the anode of said second tube across said second tube and said third resistor, said fourth resistor having an adjustable tap and the circuit junction between said bridge rectifier and said fourth resistor being connected to the tap of said second resistor, a detector having an input terminal and an output terminal, said input terminal being connected to said adjustabel tap of said fourth resistor, a rectifier connected between the output terminal of said detector and the junction between said first resistor and said first capacitor, and means for connecting the output terminals of said bridge rectifier to said electrical measuring instrument.

References Cited in the file of this patent

UNITED STATES PATENTS 2,378,999 Gillespie _______________ June 26, 1945